Jan. 13, 1959
W. H. LASKOWSKI
2,868,111
VERTICAL BROILER
Filed June 8, 1955
3 Sheets-Sheet 1
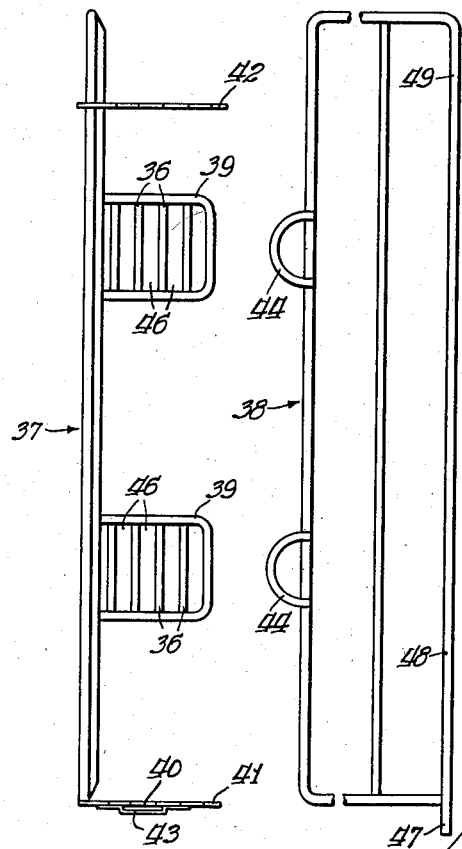
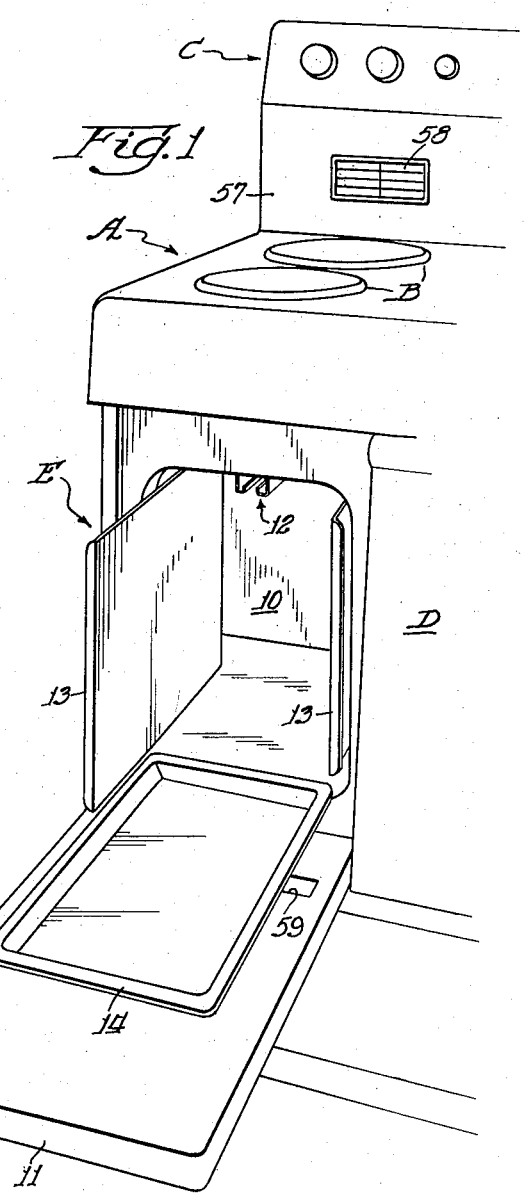
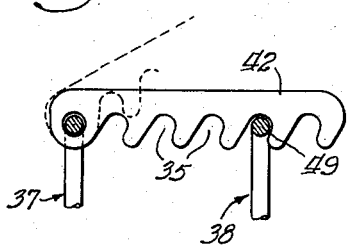
Inventor:
William H. Laskowski
By: Joseph M. Gartner
Atty.

Jan. 13, 1959

W. H. LASKOWSKI 2,868,111

VERTICAL BROILER

Filed June 8, 1955

Inventor:
William H. Laskowski
By: Joseph M. Gartner
Atty.

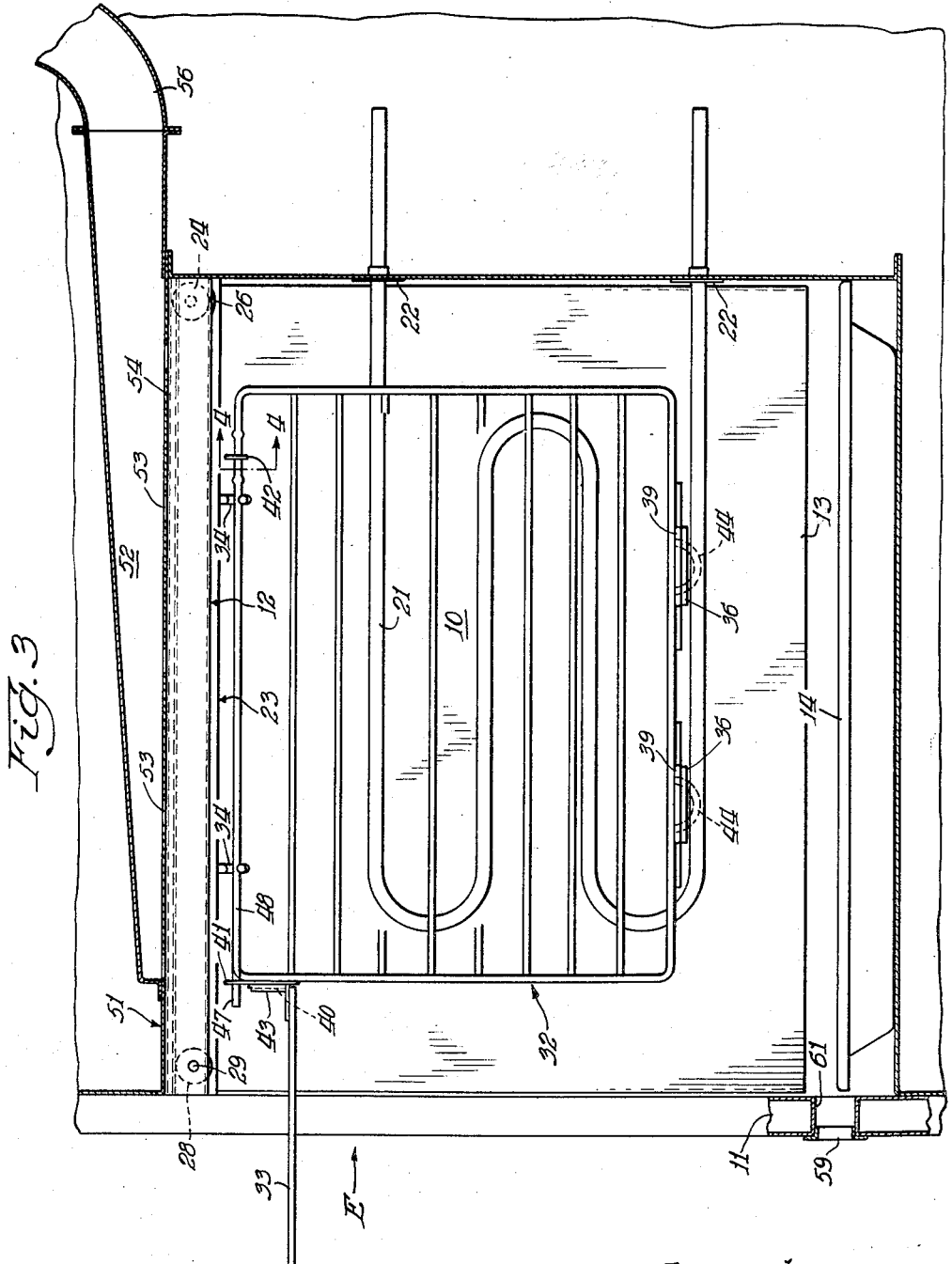

United States Patent Office 2,868,111
Patented Jan. 13, 1959

2,868,111
VERTICAL BROILER

William H. Laskowski, Effingham, Ill., assignor to Borg-Warner Corporation, Chicago, Ill., a corporation of Illinois Application June 8, 1955, Serial No. 513,994

3 Claims. (Cl. 99—392)

This invention relates to cooking devices and more particularly to apparatus for broiling foodstuffs in a vertical position.

Heretofore a large majority of broilers have been of the type wherein the food being cooked is disposed in a horizontal position immediately below a heating element. In such an arrangement it is impossible to prepare both sides of a particular article of food simultaneously. Thus, it is necessary for the housewife to prepare one side of the article and then the other in sequence.

Inherently, the interval required to broil foods is relatively short compared to the time required to cook by other methods such as baking or boiling. Because of the short cooking cycle associated with preparing foods by broiling the housewife is required to attend the preparation of the food with great care. In the horizontal apparatus equal vigilance is required in the separate preparation of each side of the food, while in utilizing the apparatus of the present invention the attention time is greatly reduced. This is so because both sides of the food are prepared simultaneously by virtue of the application of heat from both sides.

In applying heat to both sides of a particular article of food a more uniform and rapid penetration of heat is obtained with the result that the cooking time required by the apparatus of the present invention is less substantially than the total time required to prepare food of equivalent quality, thickness and weight in a horizontal broiler.

It is well known that in the operation of a horizontal broiler the access door thereto is frequently if not always kept open. This allows drafts of acrid smoke to issue from the broiler compartment and to permeate the kitchen.

It has been determined that a large percentage of the smoke that attends a horizontal broiling operation results from the combustion of fat particles which splatter upon the heating elements where they are ignited and partially burned. Certain of these hot particles fall downwardly upon the food with the result that accumulations of melted fat collected on the foodstuff are ignited and generate additional smoke.

It is a further object of the present invention to provide a broiler for cooking food in a vertical position wherein both sides of the food are prepared simultaneously.

It is a further object of the present invention to provide a vertical broiler compartment having an access door thereto which remains closed during the cooking operation.

It is a still further object of the present invention to provide a vertical broiler compartment having a novel vent means.

It is a still further object of the present invention to provide a broiler for cooking food in a vertical position with the result that there is a more uniform and rapid penetration of heat into the food.

A broiler embodying certain features of the present invention may include a casing, a flue mounted upon the casing and communicating with the interior of the casing, a pair of upstanding heating elements positioned within the casing, rack means for vertically disposing foodstuffs within the casing and between the heating elements and a fluid containing pan disposed below the rack means.

Other features and objects of the present invention will become more apparent when considered in conjunction with the appended specification and drawings wherein:

Fig. 1 is a partial view of a conventional cooking range with which the present invention may be associated;

Fig. 3 is a sectional view of Fig. 2 taken along the plane of the line 3—3 thereof;

Fig. 4 is a sectional view of a portion of Fig. 3 taken along the line 4—4 thereof;

Fig. 5 is a top view of the left portion of the food rack shown in Fig. 2; and

Fig. 6 is a plan view of the right portion of the food rack shown in Fig. 2 with certain portions thereof broken away.

Figure 2:
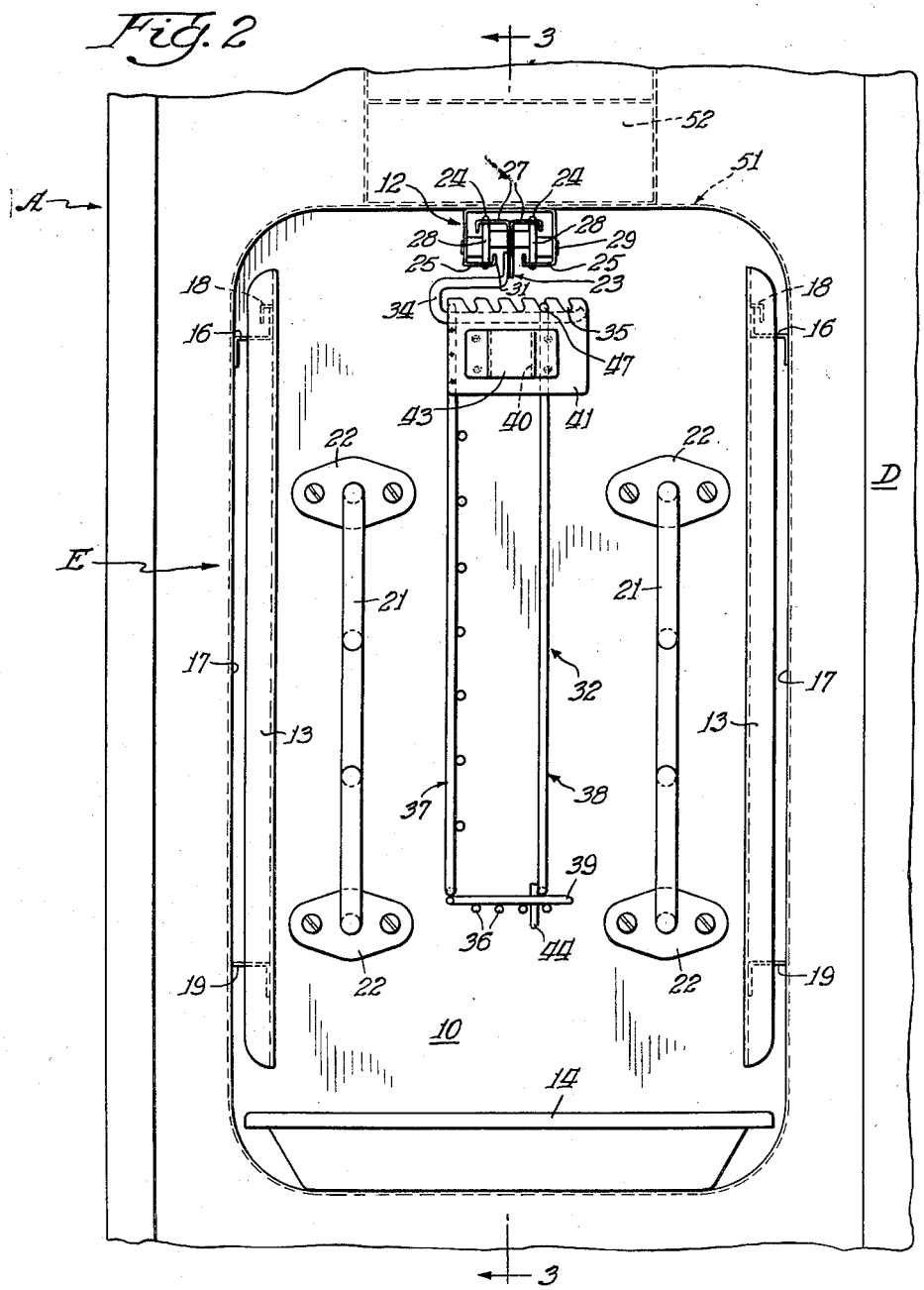
Fig. 2 is a transverse section of a vertical broiler embodying the principles of the present invention.

Referring now to Fig. 1 there is shown a portion of a conventional cooking range with which the present invention may be associated. The range indicated generally by the letter A comprises burners B, cooking controls C, oven D, and vertical broiler E.

Since the present invention is not directed to the structure of the complete range, only those features thereof will be described in detail which are necessary to show the adaptation of the vertical broiler thereto.

It is to be understood that the portion of the range A shown has been selected primarily for the purpose of setting out an environment for the invention and it is anticipated that the vertical broiler of the present invention may be adapted to a wide variety of ranges, both gas and electric, and may be disposed in various positions or locations therein.

In the exemplary embodiment of the invention shown schematically in Fig. 1 a broiler compartment 10 having an access door 11 is fitted with an overhead track 12. The track 12 serves as a support means and guide for a slide as will become more apparent hereafter. Reflector plates 13 are removably mounted within the compartment 10 and are formed of sheet metal. These plates may be readily covered with a disposable foil material such as aluminum foil thus eliminating the need for cleaning the plates. Disposed in the bottom of the compartment is a tray or pan 14. This pan is movable into and out of the broiler and likewise lends itself to the application of a liner of a thin foil of aluminum.

Referring now to Fig. 2, it is apparent that the plates 13 are removably hung upon the side walls 17 by the engagement of the brackets 16 and the hooks 18. The plates 13 are maintained in a parallel relationship and spaced from the walls 17 by the angle irons 19. A pair of electric heating elements 21 are supported in the rear wall of the compartment 10 by means of the adapters 22.

A T-shaped rail 23 carrying a pair of rollers 24 at the rear end thereof (Fig. 3) is movable into and out of the track 12. The rail 23 is supported at the rear end by the engagement of the rollers 24 with the inwardly extending flats 25 of the track. The forward end of the rail is supported by the engagement of the wings 27 with a pair of rollers 28 mounted upon the forward end of the track 12 as at 29. In order to provide a positive stop for the rail 23 with respect to the track 12 during operation of the broiler, both flats 25 are dimpled arcuately as at 26 so as to complement the radius of the rollers 24 whereby the rollers rest in the dimples 26 when the rack is in its broiling position.

It is contemplated that the track and rail assembly may be modified by eliminating the rollers 24 and 28 so that the wings 27 are supported by and slide along the upstanding portions 31 of the track 12.

An adjustable food rack indicated generally by the reference numeral 32 and having a removable handle 33 is supported upon the rail by means of the hooks 34.

Referring now to Figs. 5 and 6, the food rack is composed of two grids 37 and 38 made of wire or suitable metallic bar stock. Grid 37 is formed at the bottom thereof with two inwardly extending ears 39, each having a plurality of spaced transverse ribs 36 secured therein. The top portion of the grid 37 carries two notched locking arms 41 and 42; the forward arm 41 rigidly mounted to the grid 37 is formed with notches 35 on the upper side thereof (Fig. 2). An offset plate 43 is mounted upon the arm 41 thereby providing a slot 40 for receiving one end of the handle 33 in the manner shown in Fig. 3. The arm 42 is notched on its under side (Fig. 4) and is pivotally mounted to the grid 37.

The grid 38 is formed with a pair of loops 44 and each is insertable in corresponding spaces 46 of the mating ears 39. One end 47 of the top wire 48 of the grid 38 is positionable in a selected notch of the arm 41 while the rear end 49 of the top wire may be similarly engaged by a corresponding notch of the arm 42. By the judicious selection of spaces 46 and notches 35 it is readily apparent that the grids 37 and 38 may be adjustably assembled to form the food rack 32 shown in the assembled condition in Fig. 2.

The top wall 51 of the broiler compartment is provided with a duct 52 overlying and enclosing a plurality of holes 53 (Fig. 3) formed in the top wall 54 and communicating thereby with the interior of the broiler compartment. The duct 52 is provided with a suitable adapter 56 leading to a splash panel 57 and is vented thereby to the atmosphere through a grill 58. An air inlet opening 59 is provided in the lower regions of the broiler access door.

Thus, the broiler compartment 10 is provided with a ventilation system leading from the inlet opening 59 across the fluid containing tray or pan 14 thence upwardly through the holes 53 into the duct 52 and ultimately to the grilled opening 58 through the adapter 56. It is intended that the inlet opening 59 be so disposed with respect to the pan 14 when the access door is in a closed position that the upper wall 61 of the opening lies above the top of the pan 14.

In operation of the vertical broiler of the present invention, food such as meat, fish or poultry is placed into the rack 32 positioned upon the hooks 34 with the rail 23 so disposed that the rollers 24 thereof are within the dimples 26. Upon energizing the heating elements the broiling operation begins. Since the food rack is suspended vertically, particles of melted fat readily drain downwardly and are caught in the pan 14. It is particularly noteworthy that fat particles do not remain upon the food being prepared any longer than is necessary for the heating elements to reduce the particles to a fluid state. Thus, there is no excessive subjection of the fat particles to heat to the extent that the said particles are ignited to produce smoke. Obviously, no pools or accumulations of melted and flaming fat develop upon the food disposed vertically as is so frequently the case in a horizontal broiling operation.

It is essential that the pan 14 contain a hydrous material in a quantity at least sufficient to cover the bottom of the pan. The purpose of placing hydrous material in the pan is to provide a means for cooling accumulations of melted fat particles and other fluids that drain downwardly from the food being prepared. A further purpose of the hydrous material is to provide an accumulation of moisture below the heating elements so that evaporation of the moisture will induce a current of air to flow through the broiler along the ventilation path previously described. The evaporation develops a wall of moist air between the food being broiled and the heating elements 21 and thus tempering the browning of the surface of the food and eliminating charred and brittle areas.

It has been found that water or water bearing food stuffs such as precooked beans, peas, potatoes, rice and the like, may be disposed in the pan 14 and will provide sufficient moisture for the evaporation process described above.

It is to be particularly noted that in loading both the pan 14 and the rack 32 with food a complete meal may be prepared in the broiler of the present invention. The food disposed in the pan 14 will be basted and seasoned automatically by the fluids which accumulate therein.

While certain preferred embodiments of the invention have been specifically disclosed, it is understood that the invention is not limited thereto. Many variations will be readily apparent to those skilled in the art and the invention is to be given its broadest possible interpretation consistent with the language of the appended claims.

I claim:

1. In a broiler, a housing, an access door for said housing, a pair of spaced heating elements in said housing, a food rack between and spaced from said heating elements for disposing food in a vertical plane between said heating elements for cooking the food, a container for hydrous material beneath the rack, and ventilating means for said housing including means defining an air inlet opening in said access door proximate the top of said container and means defining an air outlet opening at the top of said housing.

2. In a vertical broiler, a housing having top, side and bottom walls, means defining an access opening in the front of said housing, an access door for said opening, heating elements disposed in said housing, means for placing food in a vertical plane between said heating elements, a container of hydrous material beneath said food placing means, and ventilating means for said housing and comprising means defining an air inlet opening at the bottom of said access door proximate the top of said container and means defining an air outlet opening at the top of said housing.

3. In a range having a top panel and a splash panel, a vertical broiler having compartment and an access door and comprising: a pair of opposed metallic reflecting surfaces, electrical heating elements positioned adjacent each reflecting surface; a track rigidly mounted to the underside of said top panel, a slide for supporting a food rack mounted upon said track and movable relative thereto, said track and slide being so disposed with respect to said heating elements that the rack is suspended between said elements; a drip pan positioned below said rack for accumulating fluids emanating from food during a broiling operation and containing an hydrous material, and means for venting the vertical broiler through the splash panel of the range and the access door and including a duct between and communicating with the compartment and the splash panel for venting the compartment to the atmosphere, and an air inlet at the bottom of said access door and adjacent the top of said drip pan to induce a current of air to flow over the evaporating hydrous material in the pan, when the heating elements are operative, and to move the moisture-laden air between the food rack and heating elements and through the duct to the atmosphere.

References Cited in the file of this patent

UNITED STATES PATENTS

| | | |
|---|---|---|
| 917,195 | Van Aller | Apr. 6, 1909 |
| 1,741,791 | Reck | Dec. 31, 1929 |
| 1,746,698 | Galer | Feb. 11, 1930 |
| 1,896,537 | Bonaccorsi | Feb. 7, 1933 |
| 1,903,324 | Codling | Apr. 4, 1933 |
| 2,030,047 | Bonzagni | Feb. 11, 1936 |
| 2,097,793 | Howell | Nov. 2, 1937 |
| 2,181,847 | Finizio | Nov. 28, 1939 |
| 2,377,873 | Finizie | June 12, 1945 |
| 2,397,040 | Pallich | Mar. 19, 1946 |
| 2,408,295 | Cossin | Sept. 24, 1946 |